(12) United States Patent
Thamizhanandan et al.

(10) Patent No.: US 10,348,914 B2
(45) Date of Patent: Jul. 9, 2019

(54) SYSTEMS AND METHODS FOR LOCALIZING A USER INTERFACE BASED ON LANGUAGE SETTINGS OF A USER COMPUTING DEVICE

(71) Applicant: XEROX CORPORATION, Norwalk, CT (US)

(72) Inventors: Thamizh Priyai Thamizhanandan, Jayankondam (IN); Ashok Jason Vedaraj, Chennai (IN); Sairam Bikkanuru, Hyderabad (IN); Deepa Vajapeyayajula, Hyderabad (IN)

(73) Assignee: Xerox Corporation, Norwalk, CT (US)

( * ) Notice: Subject to any disclaimer, the term of this patent is extended or adjusted under 35 U.S.C. 154(b) by 4 days.

(21) Appl. No.: 15/490,113

(22) Filed: Apr. 18, 2017

(65) Prior Publication Data

US 2018/0302521 A1    Oct. 18, 2018

(51) Int. Cl.
*H04N 1/00* (2006.01)
*G06F 3/12* (2006.01)
*H04N 1/32* (2006.01)
*G06F 9/451* (2018.01)

(52) U.S. Cl.
CPC ....... *H04N 1/00498* (2013.01); *G06F 3/1205* (2013.01); *G06F 3/1254* (2013.01); *G06F 3/1285* (2013.01); *G06F 9/454* (2018.02); *H04N 1/00514* (2013.01); *H04N 1/32128* (2013.01)

(58) Field of Classification Search
CPC .......... H04N 1/00498; H04N 1/00501; H04N 1/00514; H04N 1/00413; H04N 1/00424; H04N 1/00411; H04N 1/00209; H04N 1/0035; H04N 1/32128; G06F 9/4448; G06F 9/454; G06F 9/4411; G06F 3/1205; G06F 3/1225; G06F 3/1254; G06F 3/1259; G06F 17/28; G06F 17/289; G06F 17/2872; G06F 17/275; G06F 17/30141; G06F 17/30976; G06F 3/1286; G06K 15/02;

(Continued)

(56) References Cited

U.S. PATENT DOCUMENTS

2004/0184108 A1* 9/2004 Takano ............. H04N 1/00413
                                                         358/400
2008/0244397 A1* 10/2008 Ferlitsch ............. H04N 1/0035
                                                         715/703

(Continued)

*Primary Examiner* — Chad Dickerson
(74) *Attorney, Agent, or Firm* — Jones Robb, PLLC

(57) ABSTRACT

The present disclosure discloses methods and systems for localizing a user interface of a multi-function device. The multi-function device presents the user interface having one or more pre-defined options in a default language. The method includes receiving a print job request submitted via a computing device. A language of the computing device is identified based on language settings of the computing device, the language being a local language of a user. A job ticket is generated including the local language. Thereafter, the print job request is sent along with the job ticket to the multi-function device. Based on the job request and the job ticket, the local language is retrieved. A language change option is displayed to the user to change the default language to the local language. Based on an input from the user, the default language of the user interface is changed to the local language.

20 Claims, 5 Drawing Sheets

(58) Field of Classification Search
CPC . G06K 15/005; G06K 15/502; G06K 15/5083
USPC ......... 358/1.1, 1.9, 1.11–1.18; 709/217, 203, 709/219; 717/174–178; 704/7, 8; 715/703, 265, 264
See application file for complete search history.

(56) References Cited

U.S. PATENT DOCUMENTS

| | | | |
|---|---|---|---|
| 2011/0058189 A1* | 3/2011 | Kuwamura | G06K 15/005 358/1.9 |
| 2012/0010871 A1* | 1/2012 | Ichimi | G06F 9/454 704/8 |
| 2013/0282360 A1* | 10/2013 | Shimota | G06F 17/28 704/7 |
| 2015/0261481 A1* | 9/2015 | Takenaka | G06F 3/1285 358/1.15 |
| 2015/0264206 A1* | 9/2015 | Maeda | H04N 1/00509 358/1.13 |
| 2016/0088089 A1 | 3/2016 | Migdalovich et al. | |
| 2017/0279990 A1* | 9/2017 | Xu | G06F 9/454 |
| 2018/0091668 A1* | 3/2018 | Tanaka | H04N 1/00384 |

\* cited by examiner

SYSTEMS AND METHODS FOR LOCALIZING A USER INTERFACE BASED ON LANGUAGE SETTINGS OF A USER COMPUTING DEVICE

TECHNICAL FIELD

The presently disclosed embodiments are directed to the field of printing, and more particularly to systems and methods for localizing a user interface based on language settings of a computing device.

BACKGROUND

Business devices such as a multi-function device, a photocopier machine, a scanning device, etc., allow users to perform various functions like printing, copying or scanning. With the advancement of technology, it has become a common practice in the consumer goods (or appliances) industries to manufacture such devices/products with configurations in languages based on geography or location where these devices are distributed, sold and/or operated. For example, if a consumer appliance (e.g., a photocopier machine) is intended to be distributed and/or sold in China, the consumer appliance is configured in Mandarin or Cantonese language. Similarly, if a consumer appliance is to be sold in Japan, the appliance is configured in Japanese language by default.

In this manner, it becomes easy for local people (i.e., people who understand Japanese language) to operate these devices but difficult for other users (users who don't understand or know Japanese language) to operate the same devices. For example, a person from United States of America goes to a particular location in Japan, where all such devices are configured in a native language of Japan and wishes to operate a scanning device. Here, the user may not able to operate the devices because he does not understand or well versed with the Japanese language. In such a scenario, the user has to rely on local users of that particular location who can easily understand the language configured in such devices.

At times, these business devices are configured with English language since it is the often language that people attempt to speak or read but still some users may not understand it properly, hence may not be able to operate the devices. Some solutions are available to change the language of the devices. For example, manufacturers provide options to select one or more preferred languages/known to operate the device, however, those options involves knowing the device by reading through manuals (e.g., booklet, or digital manuals), and manually select the language and then operate the device. The manual selection of languages by users may result in errors which in itself may lead to discomfort of users in operating the device and thus is not a desirable option. Moreover, the manual selection seems a time consuming activity. Also, if the device is already in a different language say, Japanese, then it is difficult to go till menu and change the language. Other solutions include changing the language via voice feedback but it becomes difficult if a person is disabled or if the accent of the person is not very clear. In such cases, the voice feedback may not be helpful.

It may therefore be advantageous to provide methods and systems to enable users to change a language of a user interface, without having to navigate to language settings option, without having to understand instructions in foreign language, and/or without having to provide voice based instructions.

SUMMARY

The present disclosure discloses methods and systems for localizing a user interface of a multi-function device. The multi-function device presents the user interface having one or more pre-defined options in a default language. The method includes receiving a print job request by a print driver, the print job request is submitted via an application running on a computing device. A language of the computing device based on language settings of the computing device is identified, the language of the computing device being a local language of a user. Then, a job ticket is generated by the print driver including the local language of the user. Thereafter, the print job request is sent along with the job ticket to the multi-function device via an Internet Printing Protocol (IPP). Based on the job request and the job ticket, the local language is retrieved by the multi-function device. A language change option is displayed to the user to change the default language of the user interface to the local language. Based on an input from the user, the default language of the user interface is changed to the local language. Then, the user interface of the multi-function device is displayed in the local language of the user.

According to embodiments illustrated therein, a method for localizing a user interface of a multi-function device is disclosed. The multi-function device presents the user interface in a default language. The method includes receiving a print job request along with a job ticket from a computing device, the job ticket includes language settings of the computing device, wherein the language settings of the computing device indicate a local language of a user. Based on the job request and the job ticket, the local language of the user is identified. Then, the local language is retrieved for presenting to the user. An option is displayed to the user to change the default language of the user interface of the multi-function device to the local language, when the user accesses a job queue at the multi-function device. Based on an input from the user, the default language of the user interface is changed to the local language. The user interface of the multi-function device is displayed in the local language of the user, enabling the user to operate the multi-function device in the local language of the user.

According to embodiments illustrated herein, a system having a computing device and a multi-function device is disclosed. The computing device includes a print driver and is configured for: receiving a print job request, the print job request is submitted via an application running on the computing device; upon receiving, identifying a language of the computing device based on language settings of the computing device, the language of the computing device indicate a local language of a user; generating a job ticket including the local language of the computing device; sending the print job request along with the job ticket to a multi-function device via an Internet Printing Protocol (IPP). The multi-function device presents the user interface in a default language and is configured for: receiving the job request and the job ticket as sent by the computing device; based on the job request and the job ticket, retrieving the local language; displaying a language change option to the user to change the default language to the local language; based on an input from the user, changing the default language of the user interface to the local language; displaying the user interface of the multi-function device in the local language of the user; and enabling the user to perform one or more functions using the local language of the user interface.

According to additional embodiments illustrated herein, a multi-function device for localizing a user interface is disclosed. The multi-function device presents a user interface in a default language. The multi-function device includes a controller and a user interface. The controller includes a local language detection module configured for: receiving a print job request along with a job ticket from a computing device, the job ticket includes language settings of the computing device, wherein the language settings of the computing device indicate a local language of a user; based on the job request and the job ticket, identifying the local language of the user; retrieving the local language; and changing the default language of the user interface to the local language. The user interface is configured for: displaying an option to the user to change the default language of the user interface of the multi-function device to the local language, when the user accesses a job queue; displaying pre-defined options of the multi-function device in the local language of the user for performing one or more functions; and enabling the user to perform functionality related to printing.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
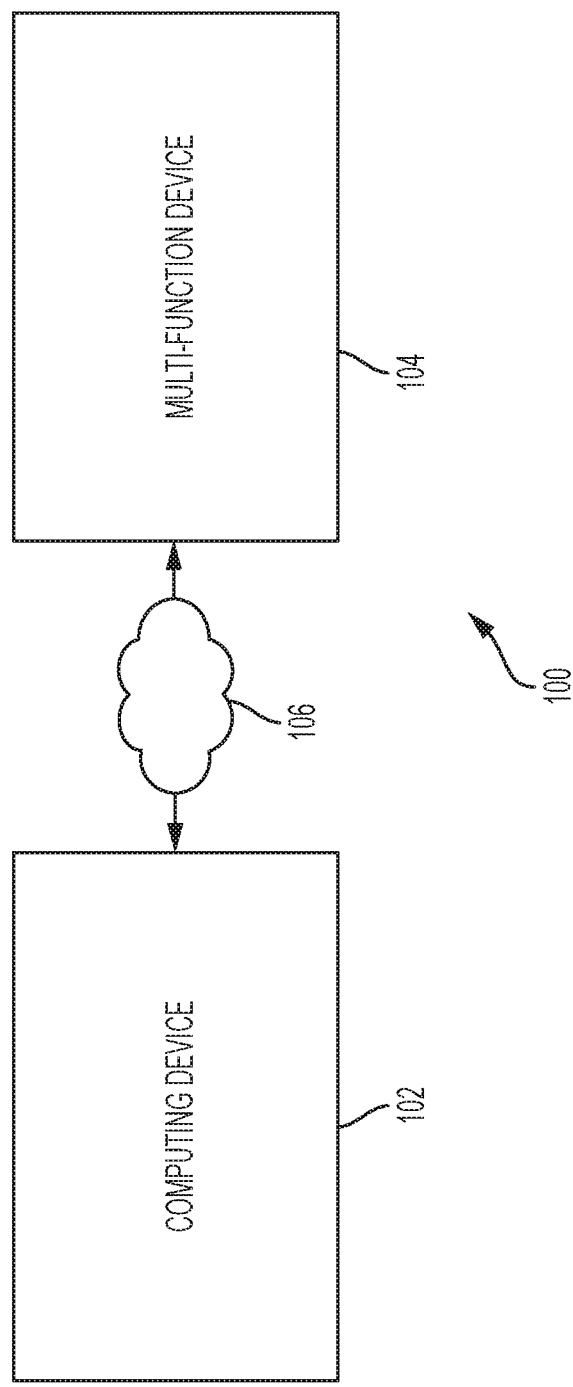
FIG. 1 illustrates an exemplary environment, in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Definitions

Definitions of one or more terms that will be used in this disclosure are described below without limitations. For a person skilled in the art, it is understood that the definitions are provided just for the sake of clarity, and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. The multi-function device is configured with a default language based on geography or a location where the multi-function device is sold or distributed. In the context of the current disclosure, the multi-function device is configured to detect one or more local languages based on print jobs/tickets.

The "default language" is the language which the multi-function device in is configured to operate, at the time of manufacturing. The default language is also known as a pre-defined or a pre-configured language of the multi-function device. For example, the pre-defined language of the multi-function device may be, but not limited to, English. The pre-defined language is dependent on geography or location where the multi-function device is sold or distributed.

The term "user interface" is defined to include an interface shown on the multi-function device and is operable by a user to perform functions such as change setting, check status, initiate print, initiate scan, or any other functions. Here, the user interface displays an option (i.e., a language change option) to the user to change the pre-defined language of the multi-function device to the local language. The user interface is a touch-sensitive multi-lingual user interface that may support a variety of languages and the language is changed based on the print job requests/job tickets submitted by the user.

The term "local language" refers to the language which is understood or known by the user who wishes to operate the multi-function device. Further, the local language is determined based on a language of a computing device or language of an operating system (OS) of the computing device. The local language may also be termed as the native language of the user.

The term "print job request" includes a request for printing one or more documents.

A "computing device" refers to a user device that includes a processor/microcontroller and/or any other digital component, or a device or a system that performs one or more operations according to one or more programming instructions. In the context of the present disclosure, the computing device is a user device for submitting one or more print job requests. Examples of the computing device include, but are not limited to, a personal computer, a laptop, a mobile phone, a tablet, a PDA, a smart-phone or any other device capable of data communication.

A "print queue" refers to a queue of print jobs that are requested by the user, but yet not executed by the multi-function device for printing. In the print queue, the print jobs may be held due to various reasons, such as network congestion, lack of resources, or requirement of a secure passcode.

The phrase "localization" refers to a process of customizing the user interface for a desired language by changing a language included in the user interface.

Overview

Typically business devices such as multi-function devices are manufactured such that the devices overall provide same kind of functionality to all users, but due to different language adopted across the world, the manufacturers configure these devices in a language specific to a region, where these devices are sold. Most of the users are able to operate the device in a default language but some users (outside users or other users) may not be comfortable operating the multi-function device in the default language. In order to enable such users to operate the multi-function device according to their comfort or languages known to them, the present disclosure provides methods and systems for localizing a user interface based on language settings of a computing device which he typically uses for submitting print commands.

Exemplary Embodiments

FIG. 1 illustrates an exemplary environment 100, where various embodiments of the present disclosure can be practiced. As shown, the environment 100 includes a computing device 102 and a multi-function device 104 connected over a network 106. The network 106 may be a wired network, wireless network or a combination of these. The network 106 may be an individual network or a collection of many such individual networks, interconnected with each other and functioning as a single large network, for example, the Internet or an intranet. The network 106 may be implemented as one of the different types of networks, such as intranet, local area network (LAN), wide area network (WAN), the internet, near field communication (NFC), and such networks. The network 106 may either be a dedicated network or a shared network, which represents an association of the different types of networks that use a variety of protocols. The network 106 may include network devices, such as network switches, hubs, routers, HBAs, for providing a communication link between the multi-function device 104 and other connected devices/systems.

The computing device 102 is the device typically used by the user for performing his day to day activities like emails, social networking, surfing or the like. The computing device 102 may be a personal computer, a laptop, a mobile phone, a tablet, a PDA, a smart-phone or any other device capable of data communication. It will be apparent to a person skilled in the art that more computing devices similar to the computing device 102 may be added to the environment 100, without limiting the scope of the disclosure. The multi-function device 104 is typically used for performing at least one function of printing, scanning and copying according to one or more programming instructions. Examples of the multi-function device 104 include, but are not limited to, a multifunction peripheral (MFP) device, a multifunction printer (MFP), a printer, or a combination of these.

The computing device 102 receives a print job request from an application running on the computing device 102 such as MS word, MS Excel, MS PPT or the like. The computing device 102 identifies a language of the computing device 102, the language of the computing device 102 is the local language of the user. The print job request along with the language information is sent to the multi-function device 104. The multi-function device 104 receives the job request and identifies the local language from the received details. Based on the local language, the multi-function device 104 checks the local language availability at the multi-function device 104 and display an option to the user to change the default language of the multi-function device 104. Based on an input from the user, the multi-function device 104 changes the default language of the user interface to the local language for better operability of the multi-function device 104. More details will be discussed below.

A number of protocols may be used for transmitting the print job requests from the computing device 102 to the multi-function device 104 such as industry-standard or proprietary printing protocols including Internet Printing Protocol (IPP), Line Printer Daemon (LPD) protocol, Netware, NetBIOS/NetBEUI, or JetDirect or the like.

Figure 2:
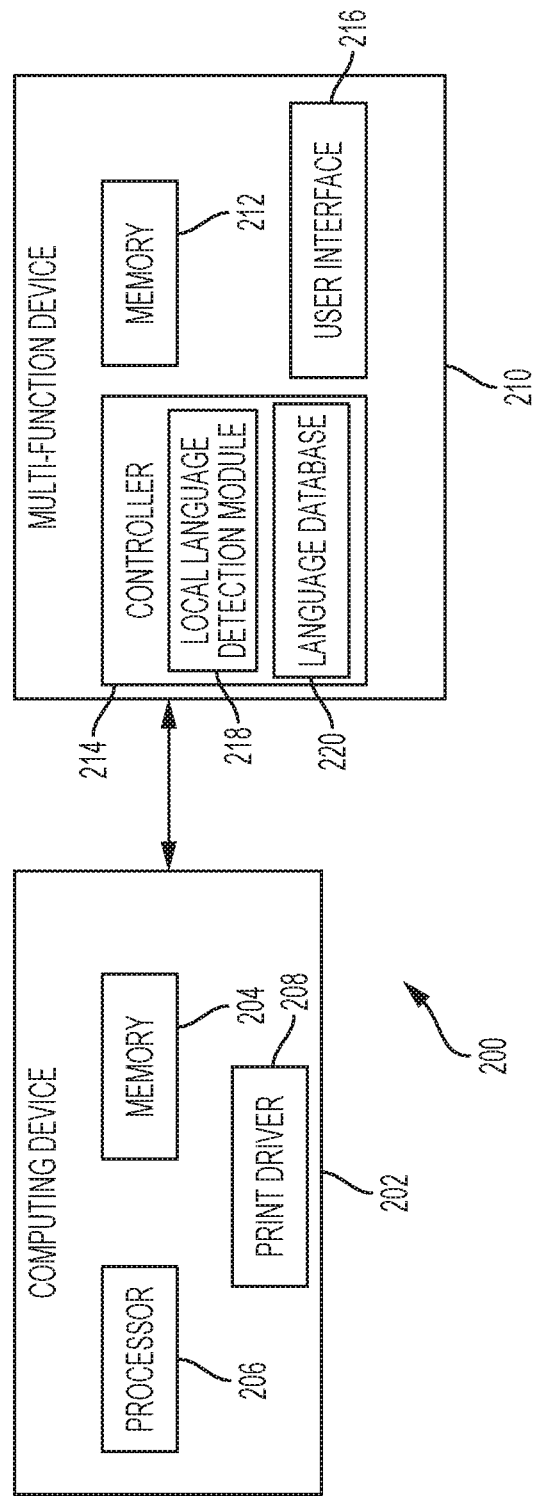
FIG. 2 shows an overall exemplary system, according to an embodiment of the current disclosure.

FIG. 2 shows an overall exemplary system 200 for implementing the current disclosure. As shown, FIG. 2 includes a computing device 202 and a multi-function device 210 connected over a network (although not shown). The network may be a wireless network, a wired network or a combination thereof. The network may be implemented as one of the different types of networks, such as intranet, Local Area Network (LAN), Wide Area Network (WAN), the Internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

Various examples of the computing device 202 may be, but not limited to, a desktop PC, a laptop, a notebook, a workstation, a personal digital assistant (PDA), a mainframe computer, a mobile computing device, a mobile device, an internet appliance, and so on. In all, the computing device 202 may be any electronic device that can be used by the user for submitting print job requests or giving print commands.

The computing device 202 includes a memory 204, a processor 206, and a print driver 208. The memory 204 stores information related to the user as well as details which are being accessed by the user using the computing device 202. Further, the memory 204 stores various settings of the computing device 202 such as operating system, language, processor type, installed memory, etc., of the computing device 202. The memory 204 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes.

The processor 206 processes all requests from the user, allocate resources and the like. An application (although not shown) runs on the computing device 202 such as MS word, MS Excel, MS power point or any other application that can be used by the user for his daily tasks or otherwise. Using the application, the user gives print commands which are then sent to the print driver 208 of the computing device 202.

The print driver 208 runs on the computing device 202 (not visible to the user) that manages one or more print commands as received by the user. In the context of the current disclosure, the print driver 208 receives a print job request from the application running on the computing device 202. The print job request is the request for printing one or more documents. The documents may include text, image, graphics, or a combination thereof. The print driver 208 receives the job request from the application and converts the request into a format that is understandable by the multi-function device 210. Upon receiving the print command from the application, the print driver 208 identifies a local language of the user. The local language is identified from language settings of the computing device 202 or from language settings of an operating system of the computing device 202. For example, the print driver 208 accesses features of an operating system via an application programming interface (API) as known in the art or developed later. The language settings define the language of the computing device 202. For example, the language may be English, Hindi, Japanese or the like. The language of the computing device 202 is considered as the local language which is easily understandable by the user or the user is well versed with the language to operate the multi-function device 210. The print driver 208 then generates a job ticket including language settings of the computing device 202 that is the local language of the user. Further, the print driver 208 transmits the job request along with the job ticket to the multi-function device 210 via an IPP (Internet Printing Protocol). Other secure protocols may be used for transmitting the information (i.e., job request and the job ticket) from the computing device 202 to the multi-function device 210.

The multi-function device 210 receives the job request and the job ticket from the computing device 202 or from the print driver 208 of the computing device 202 and passes the received details to the memory 212 for storage.

The memory 212 stores the job request and the job ticket as received from the computing device 202. The memory 212 further stores one or more languages, wherein the one or more languages may include the local language of the user.

The user interface 216 displays various pre-defined options such as scanning, printing, settings etc. The options are displayed in a default language of the multi-function device 210. The default language is the language which is pre-configured in the multi-function device 210 and the default language is configured at the time of manufacturing the multi-function device 210. The default language is based on geography or the location where the multi-function device 210 is distributed, made or sold. For example, if the multi-function device 210 is distributed to Japan, the default language may be Japanese. In another example, if the multi-function device 210 is made in United States, the default language may be English.

Based on the received details, the controller 214 processes the received job request and the job ticket. The controller 214 includes a local language detection module 218 and a language database 220. The controller may include more than one language database. The language database 220 stores one or more languages, of which at least one language is the local language of the user.

The local language detection module 218 identifies the local language based on the job ticket. Here the job ticket includes the local language of the user. The local language detection module 218 then checks for the availability of the local language with the multi-function device 210. If available, the controller 214 retrieves the local language from the memory 212 of the multi-function device 210 or from the one or more language databases 220. The controller 214 checks whether the default language of the multi-function device 210 is same as that of the local language. In case the default language is different from that of the local language, then the multi-function device 210 displays a language change option to the user to change the default language of the multi-function device 210. The language change option is displayed or enabled for the user when the user accesses a job queue at the multi-function device 210. When accessed, the language change option shows the identified local language of the user and requests the user to confirm the change.

The user chooses the displayed option and based on the input from the user, the multi-function device 210 changes the default language of the multi-function device 210 or the user interface 216 to the local language. The multi-function device 210 presents the user interface 216 in the local language to perform one or more functions. For example, the user may change the settings related to print request, release print by submitting password or may wish to perform any additional function. Once the local language is presented, the user can use the user interface 216 as displayed in the local language to perform any functionality related to printing as mentioned or copying, form fills, etc.

In cases, where the local language is not available with the multi-function device 210, the multi-function device 210 contacts a server (although not shown). The server stores one or more languages, of which at least one language is the local language of the user. The multi-function device 210 downloads the local language from the server and installs the local language on the multi-function device 210. Once the local language is configured on the multi-function device 210, the user performs any print related functions at the multi-function device 210. In addition to print, the user may use the localized user interface 216 to perform any functions such as scanning, copying, faxing, form fillings, or the like. In this manner, the user interface 216 of the multi-function device 210 is localized.

Figure 3A:
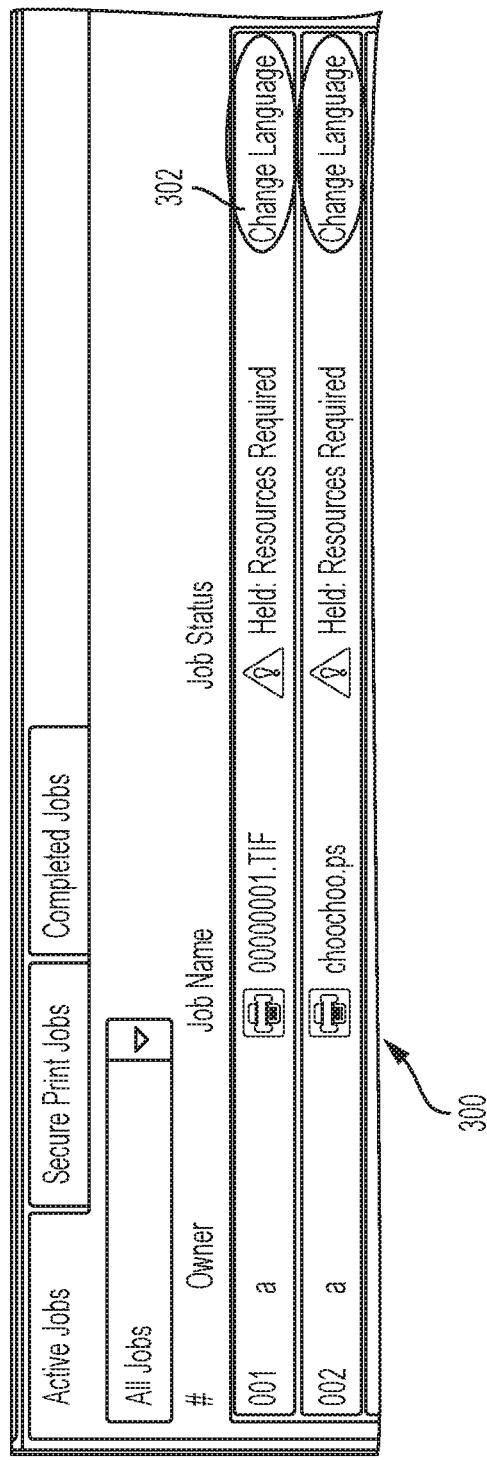
FIGS. 3A and 3B illustrate exemplary user interface snapshots.
Figure 3B:
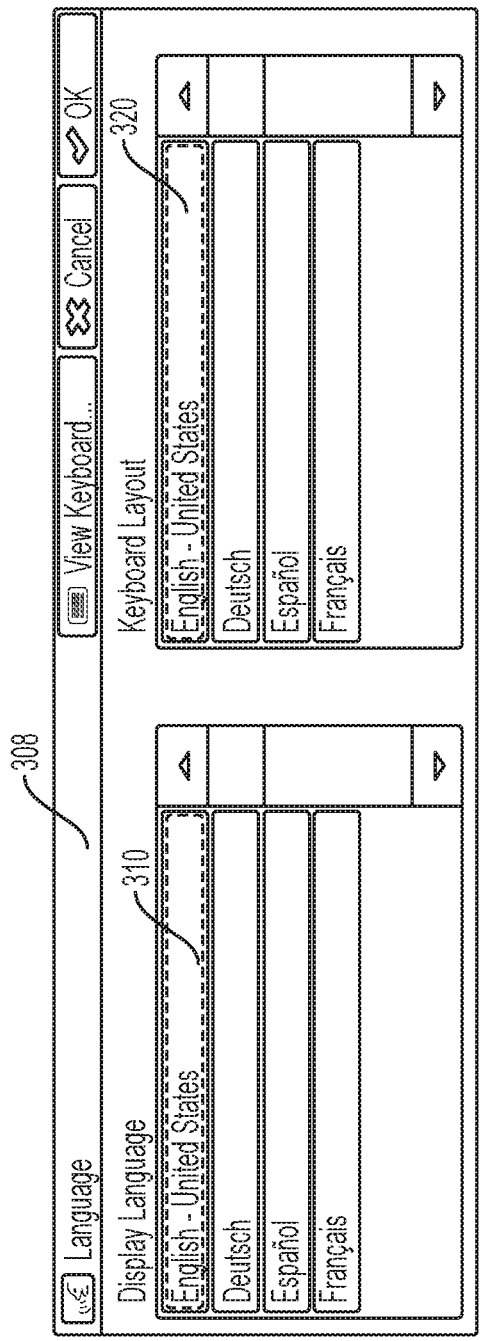

FIGS. 3A-3B show exemplary snapshots of user interfaces indicating a language change option and one or more languages displayed as a list. As shown in FIG. 3A, the interface 300 shows a language change option, marked as 302. The language change option 302 is shown in a job queue of the multi-function device 210.

In some cases, when the user clicks the option 302, a number of related local languages are shown to the user in the snapshot 308 of FIG. 3B, when the local language is not available with the multifunction device. The snapshot 308 further shows a number of language options as display language (marked as 310) and keyboard language (320). The user selects a language and the selected language is changed by the multi-function device 210. For example, if the user wishes to change the display language, the user may choose a language (shown in the box 310) from the related languages shown under display language tab. But if the user wishes to change the keyboard language, the user may choose a language shown in the block 320. If the user wishes to change both, i.e., the display language and the keyboard language, the user chooses both. In some cases, when the user clicks the option 302, a display language of the user interface is automatically changed to a local language of the user.

Figure 4:
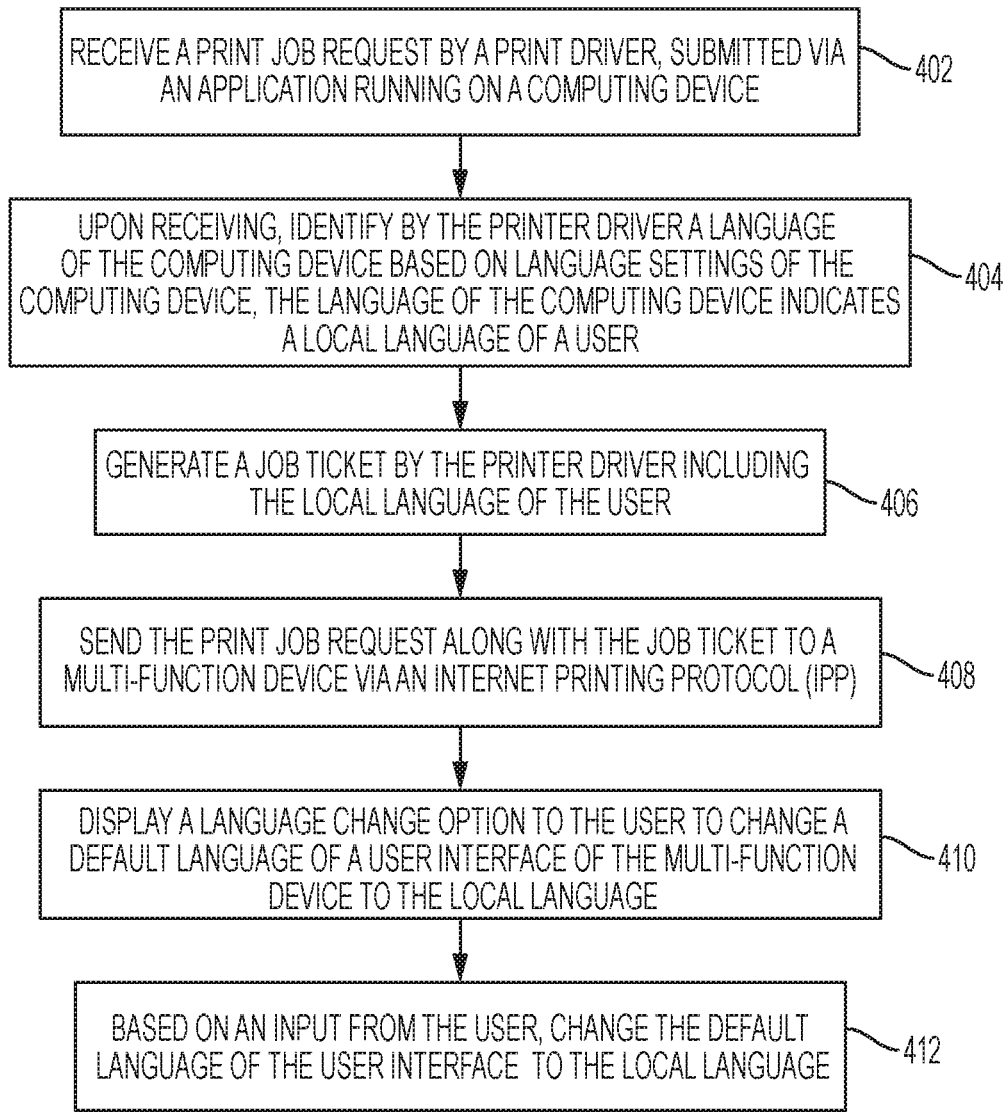
FIG. 4 is a flowchart illustrating a method for localizing a user interface of a multi-function device.

FIG. 4 is a method flowchart for localizing a user interface based on a language of a computing device.

The method starts when a user submits a print job request via an application running on a computing device. Various examples of the application may include a word document, an Excel document, a power point presentation, a PDF document, or the like. It is considered that a language of the computing device is a local language of the user.

At 402, the print job request is received by a print driver of the computing device. The print job request is submitted via the application running on the computing device. The print job request includes one or more documents for printing. The document may be of any type, format or may include objects, text, graphics or a combination thereof. Upon receiving, at 404, a language of the computing device is identified by the print driver based on language settings of the computing device. In particular, the language of the operating system of the computing device is identified. The operating system language or the computing device language is the local language of the user. Once identified, at

406, a job ticket is generated by the printer driver, including the local language of the user. Thereafter, at 408, the print job request is sent along with the job ticket to the multi-function device. The print job request and the job ticket are sent via a protocol such as IPP, without limitation.

The print job request along with the job ticket is received. The local language is identified based on the local language as mentioned in the job ticket. Then it is checked whether the default language of the multi-function device is different from the local language of the computing device. If same, the method stops. If different, then it is checked, the identified local language is available with the multi-function device. The local language is retrieved by the multi-function device or via a server. At 410, a language change option is displayed to the user for changing the default language of the device to the local language. The language change option is displayed to the user when the user accesses a job queue at the multi-function device. To this end, when the user goes to the multi-function device, the user selects its job in the queue, the local language which is derived out of the job ticket is shown to the user and further allows the user to change the default language with single touch, for example.

Based on an input or response from the user, the default language of the user interface is changed to the local language at 412. Here, the pre-defined options such as Print, Scan, Copy, etc., are displayed in the local language to the user.

In some embodiments, the default language of the user interface is automatically changed to the local language of the user, i.e., without any inputs from the user.

In cases, where the local language is not available, one or more languages related to the local language are identified and then displayed to the user for further action.

The disclosure discloses methods and systems for localizing a user interface based on a language of a computing device. The methods and system provides an easy and quick way to switch to his preferred native language via accessing a job queue. Further, users need not manually go and search among all the available languages and choose their preferred language, this is a little time consuming. The disclosure further facilitates a streamlined way to set a language of the user interface in a printing environment without having to navigate to infrequently used and somewhat difficult to access language settings. This enhances the user satisfaction by making them feel at home and increase productivity in the market.

For a person skilled in the art, it is understood that the use of phrase(s) "is," "are," "may," "can," "could," "will," "should" or the like is for understanding various embodiments of the present disclosure and the phrases do not limit the disclosure or its implementation in any manner.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "identifying," or "receiving," or "displaying," or "storing," or "changing," "or sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of converting a default language of a multi-function device user interface to a local language, the method comprising:
   receiving a print job request by a printer driver, wherein the print job request is submitted via an application running on a computing device;
   upon receiving by the printer driver, identifying a language of the computing device based on language settings of the computing device, the language of the computing device being a local language of a user;
   generating a job ticket by the printer driver including the local language of the user;
   sending the print job request along with the job ticket to a multi-function device comprising the multi-function device user interface and a printer via an Internet Printing Protocol (IPP);
   based on the print job request and the job ticket, retrieving the local language of the user or, when the local language of the user is not available, a related language by the multi-function device;
   displaying a language change option to the user on the multi-function device user interface to change the default language of the multi-function user interface to the local language of the user or to the related language, wherein displaying the language change option comprises displaying the language change option along with a job name in a job queue of the multi-function device on the multi-function device user interface in a first image;
   based on a selection of the language change option, displaying in a second image on the multi-function device user interface, a display language change option and a keyboard language change option, wherein the display language change option and the keyboard language change option comprise a list of one or more related languages comprising the related language when the local language of the user is not available;
   based on a selection of the display language change option, changing the default language of the multi-function device user interface to the local language of the user or to the related language; and
   displaying the multi-function device user interface in the local language of the user or to the related language.

2. The method as claimed in claim 1, wherein the language settings of the computing device include language settings of an operating system of the computing device.

3. The method as claimed in claim 1, wherein the language settings of the computing device are stored in a memory of the computing device.

4. The method as claimed in claim 1, further comprising, comparing the default language of the multi-function device with the local language of the user.

5. The method as claimed in claim 1, further comprising, displaying the language change option to the user on the multi-function device user interface, when the user accesses a job queue at the multi-function device through the multi-function device user interface.

6. The method as claimed in claim 1, further comprising, downloading the local language of the user from a server, when the local language of the user is not available with the multi-function device.

7. A method for localizing a language of a multi-function device user interface at a multi-function device, the method comprising:
   receiving, by the multi-function device comprising the multi-function device user interface and a printer, a print job request along with a job ticket from a computing device, wherein the job ticket includes language settings of the computing device, and wherein the language settings of the computing device indicate a local language of a user;
   based on the print job request and the job ticket, identifying the local language of the user;

retrieving the local language of the user or, when the local language of the user is not available, a related language for presenting to the user;

based on the user accessing a job queue at the multi-function device through the multi-function device user interface, displaying on the multi-function device user interface an option to the user to change a default language of the multi-function device user interface to the local language of the user or to the related language, wherein displaying the option comprises displaying a language change option along with a job name in a job queue of the multi-function device on the multi-function device user interface in a first image;

based on a selection of the language change option, displaying in a second image on the multi-function device user interface, a display language change option and a keyboard language change option, wherein the display language change option and the keyboard language change option comprise a list of one or more related languages comprising the related language when the local language of the user is not available;

based on a selection of the display language change option, changing the default language of the multi-function device user interface to the local language of the user or to the related language; and displaying the multi-function device user interface in the local language of the user or to the related language, enabling the user to operate the multi-function device in the local language of the user or in the related language.

8. The method as claimed in claim 7, further comprising, downloading the local language of the user from a server, when the local language of the user is not available with the multi-function device.

9. The method as claimed in claim 8, further comprising, installing the local language of the user on the multi-function device.

10. A system, comprising:
a computing device comprising a printer driver, the printer driver configured for:
receiving a print job request, wherein the print job request is submitted via an application running on the computing device;
upon receiving, identifying a language of the computing device based on language settings of the computing device, the language of the computing device indicates a local language of a user;
generating a job ticket including the local language of the user;
sending the print job request along with the job ticket to a multi-function device via an Internet Printing Protocol (IPP); and
the multi-function device comprising a multi-function device user interface located at the multi-function device, the multi-function device configured for:
receiving the print job request and the job ticket as sent by the computing device;
based on the print job request and the job ticket, retrieving the local language of the user or, when the local language of the user is not available, a related language;
displaying a language change option to the user to change a default language to the local language of the user or to a related language, wherein displaying the language change option comprises displaying the language change option along with a job name in a job queue of the multi-function device on the multi-function device user interface in a first image;

based on a selection of the language change option, displaying in a second image on the multi-function device user interface, a display language change option and a keyboard language change option, wherein the display language change option and the keyboard language change option comprise a list of one or more related languages comprising the related language when the local language of the user is not available;

based on a selection of the display language change option, changing the default language of the multi-function device user interface to the local language of the user or to the related language;

displaying the multi-function device user interface in the local language of the user or in the related language; and enabling the user to perform one or more functions using the local language of the user.

11. The system as claimed in claim 10, wherein the language settings of the computing device include language settings of an operating system of the computing device.

12. The system as claimed in claim 10, wherein the multi-function device is configured for downloading the local language of the user from a server, when the local language of the user is not available with the multi-function device.

13. The system as claimed in claim 10, wherein the multi-function device is configured for comparing the default language of the multi-function device with the local language of the user.

14. The system as claimed in claim 10, wherein the multi-function device is configured for displaying the language change option to the user on the multi-function device user interface, when the user accesses a job queue at the multi-function device through the multi-function device user interface.

15. A multi-function device configured to localize a multi-function device user interface at the multi-function device, the multi-function device comprising:
a controller comprising a local language detection module, configured for:
receiving a print job request along with a job ticket from a computing device, the job ticket includes language settings of the computing device, wherein the language settings of the computing device indicate a local language of a user;
based on the print job request and the job ticket, identifying the local language of the user;
retrieving the local language of the user or, when the local language of the user is not available, a related language; and
changing a default language of the multi-function device user interface to the local language of the user or to the related language; and
the multi-function device user interface configured for:
displaying an option to the user on the multi-function device user interface to change the default language of the multi-function user interface to the local language of the user or the related language, wherein displaying the option comprises displaying a language change option along with a job name in a job queue of the multi-function device on the multi-function device user interface, the language change option comprises a display language change option and a keyboard language change option, the display language change option and the keyboard language change option comprise a list of one or more related languages comprising the related language when the local language of the user is not available, and the multi-function device user interface is located at the multi-function device;

displaying on the multi-function device user interface pre-defined options of the multi-function device in the local language of the user or in the related language for performing one or more functions; and enabling the user to perform functionality related to printing.

16. The multi-function device of claim 15, wherein the controller includes a language database configured for storing one or more languages.

17. The method as claimed in claim 1, further comprising: based on a selection of the keyboard language change option, changing the default language of a keyboard on the multi-function device user interface to the local language of the user or to the related language; and displaying the keyboard in the local language of the user or in the related language.

18. The method as claimed in claim 7, further comprising: based on a selection of the keyboard language change option, changing the default language of a keyboard on the multi-function device user interface to the local language of the user or to the related language; and displaying the keyboard in the local language of the user or in the related language.

19. The system as claimed in claim 10, wherein:

the printer driver is further configured for, based on a selection of the keyboard language change option, changing the default language of a keyboard on the multi-function device user interface to the local language of the user or to the related language; and the multi-function device is further configured for displaying the keyboard in the local language of the user or in the related language.

20. The multi-function device of claim 15, wherein:

the controller is further configured for, based on a selection of the keyboard language change option, changing the default language of a keyboard on the multi-function device user interface to the local language of the user or to the related language; and the multi-function device user interface is further configured for displaying the keyboard in the local language of the user or in the related language.

* * * * *